Jan. 12, 1932.　　　G. ADAMS　　　1,840,802
WARP STOP MOTION FOR LOOMS
Filed June 1, 1928　　　3 Sheets-Sheet 1

Inventor:
George Adams
by Chas. F. Randall
atty.

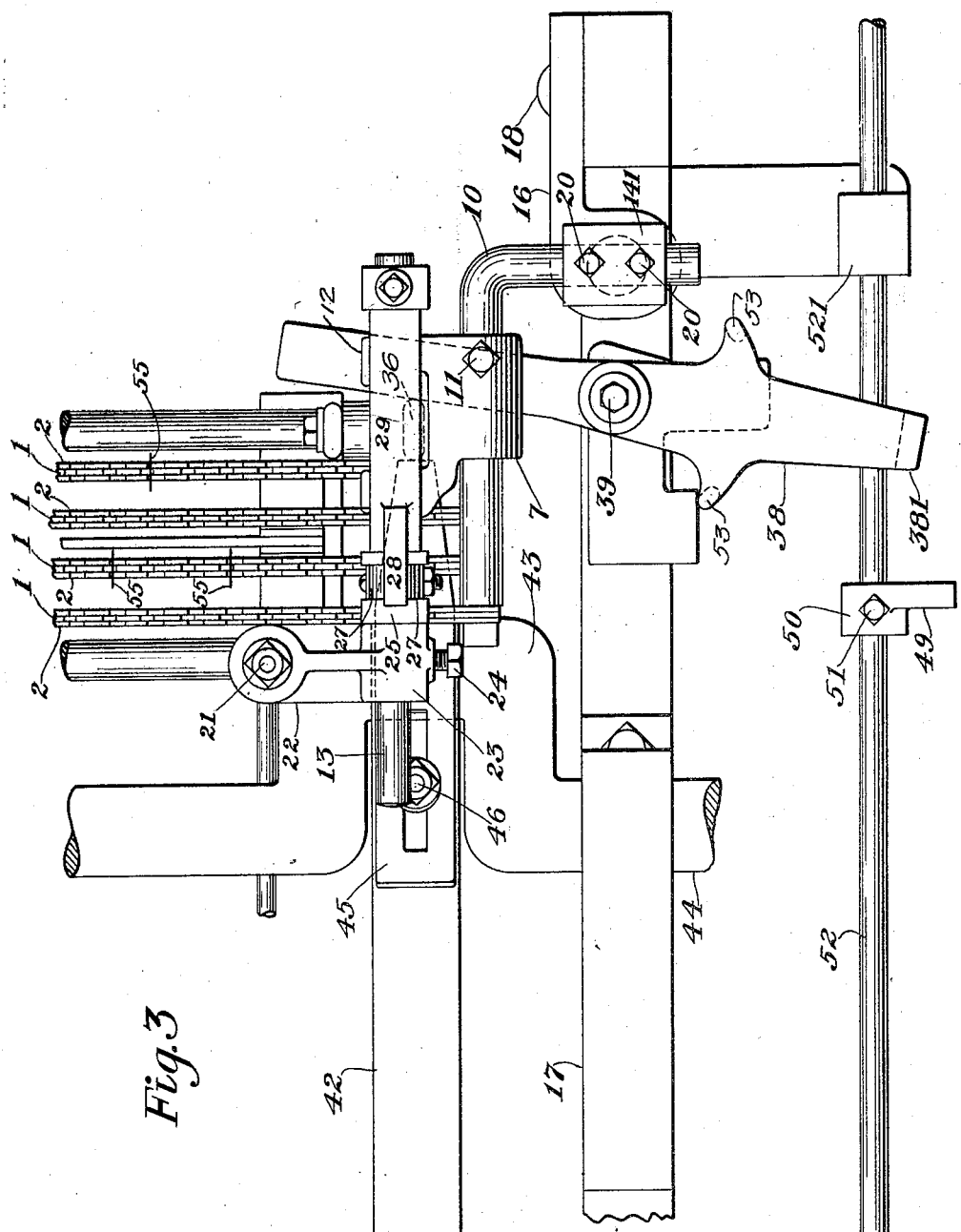
Fig. 3
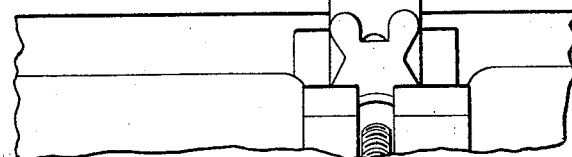

Patented Jan. 12, 1932

1,840,802

UNITED STATES PATENT OFFICE

GEORGE ADAMS, OF TAFTVILLE, CONNECTICUT, ASSIGNOR TO THE STAFFORD COMPANY, OF BOSTON, MASSACHUSETTS, A CORPORATION OF MASSACHUSETTS

WARP STOP MOTION FOR LOOMS

Application filed June 1, 1928. Serial No. 282,079.

The invention has relation to warp-stop motions for looms, warping machines, &c., and more particularly to warp-stop motions of the type comprising one or more yieldingly-actuated notched or toothed feeler-bars, extending transversely of a loom or other machine and reciprocated endwise, arranged for cooperation with drop-wires hung upon the warps and adapted to be stopped in the reciprocating movement thereof by a drop-wire which has been permitted to fall as a result of breakage of the warp-yarn upon which it is hung, such bars having operatively combined therewith devices by means of which when such reciprocating movement is arrested power-controlling mechanism is actuated to stop the working of the loom or other machine.

The invention comprises an improvement in the devices just referred to, through which the power-controlling devices are actuated to unship the driving power and stop the working of the loom or other machine in case of warp breakage and consequent arrest of the reciprocating movement of the toothed bar or bars.

The invention is characterized by the employment, in combination with the said yieldingly-actuated endwise-reciprocating notched or toothed feeler-bar or bars, and a moving striker, of a dog that is coupled with the said reciprocating notched or toothed feeler-bar or bars so that it is caused to play back and forth transversely in unison with the reciprocations of the notched or toothed feeler-bar or bars, with proper timing to escape the striker until arrest of the endwise reciprocating movement of the bar or bars by a drop-wire detains the dog in the path of the moving striker, and a transmitter-member, in operative connection with power knocking-off or unshipping means, which by the striker-produced movement of the dog is actuated to actuate the said power knocking-off or unshipping means to stop the machine.

An illustrative embodiment of the invention is shown in the accompanying drawings, in which,—

Fig. 3 is a plan view with the parts in the relation assumed when they have acted to cause unshipping of the driving power.

Fig. 4 shows in plan, but with the dog in horizontal action, the relations of the dog, the striker, and the transmitter or knock-off lever, all referred to hereinafter.

Figure 1:
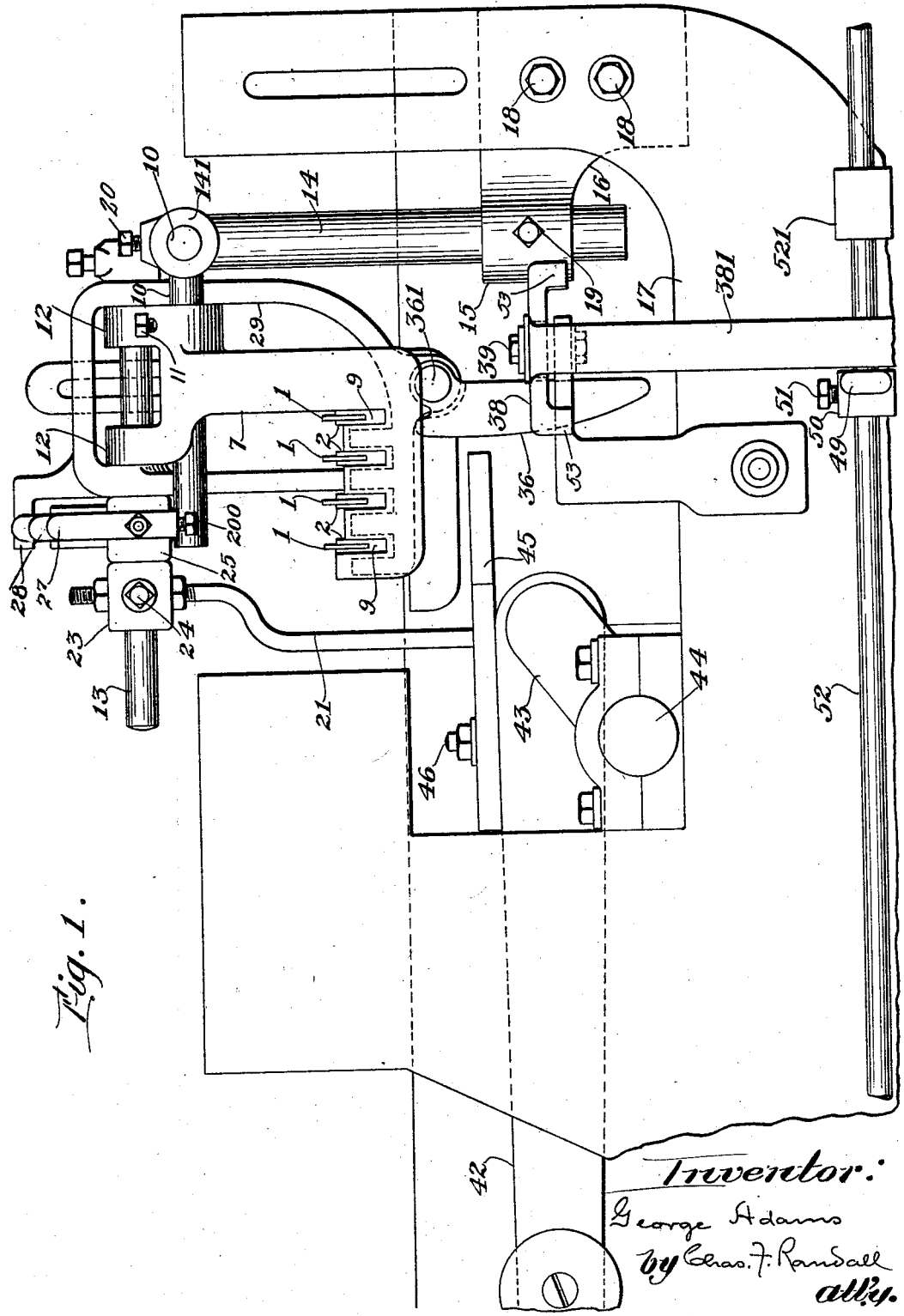
Fig. 1 shows in side elevation portions of a loom having associated therewith a warp-stop motion having the invention combined therewith, with the parts related as for continued weaving.

The drawings show a familiar form of warp-stop motion of the type aforesaid utilizing reciprocating notched or toothed bars in cooperation with the drop-wires. The construction is as hitherto employed, comprising thin notched or toothed bars 1, 1, sliding in grooves within stationary bars 2, 2, similarly toothed. The bars 1, 1, and 2, 2, together extend through slots of the drop-wires, 55, 55, which as usual are hung upon the warp-yarns in transverse rows or "banks". The stationary notched or toothed bars 2, 2, are mounted in seats constituted by notches 9, 9, Fig. 1, in the horizontally-extended lower end of an L-shaped bracket 7, shown best in Fig. 1, that is supported upon a rearwardly-extending arm of an angularly-bent rod 10, the said bracket having a hub which fits upon the said arm, and a clamping screw 11, Figs. 1 and 3, being provided in connection with such hub to hold the bracket from undesired rotation upon such portion of the rod 10. The bracket is bent obliquely inward of the loom above the level of the rod 10, see Figs. 1 and 3, and terminates in hubs 12, 12, having bearings in which is supported with capacity to turn freely therein a short rockshaft 13, the latter extending in a fore-and-aft direction. The outwardly extending angularly-bent portion of the rod 10 extends through a hub 141 on the upper portion of a post 14, the lower portion of which extends through a hub 15 on a member 16 attached to the loom-frame 17 by bolts 18, 18, a clamping screw 19 serving to fix the said post in place after adjustment of the same to the proper height. Clamping screws 20, 20, Figs. 1 and 3, in connection with hub 141 of post 14 engage with the portion of the rod 10 which occupies the hole in such hub, such screws serving to hold the forwardly-extending portion of such rod fixed in level relation in the position of transverse adjustment, which has been given to it.

The rockshaft 13 is given a rocking movement by means of a rod 21 which is given an up-and-down motion from any suitable going part of the loom, the said rod being engaged with an arm 22 (Fig. 3) having a hub 23 which fits upon rockshaft 13 and is secured thereto by clamping screw 24. For the transmission of movement from rockshaft 13 to the toothed feeler-bars 1, 1, a hub 25 clamped to the rockshaft 13 by clamping screw 200 is provided with opposite sets of leaf-springs 27, 27, which extend upward and embrace between their extremities a finger 28 on a vibrator 29 which is mounted for free vibration upon the rockshaft 13. Two branches of such vibrator extend down to the level at which the toothed bars are supported, as shown best in Fig. 2, and merge into a portion 35 having fingers 30, 30, which are provided with transverse notches to receive pins attached to the sliding toothed bars 1, 1, so that such bars may be given a reciprocating movement through the swinging of the vibrator 29 back and forth about rockshaft 13 as a center.

As heretofore, the vibrator is yieldingly actuated through the leaf-springs 27, 27, so that when a drop-wire falls and through engagement with teeth of the corresponding sliding toothed bar and its guide-bar 2 arrests the reciprocating movement of such sliding bar 1, the vibrator may stand at rest while the rockshaft 13 and the actuating means therefor continue their motion. In the illustrated embodiment of the features of the invention this checking of the swinging motion of the vibrator actuating the sliding bars 1 is utilized, as in prior devices of the same type, to bring about stopping of the loom.

Figure 2:
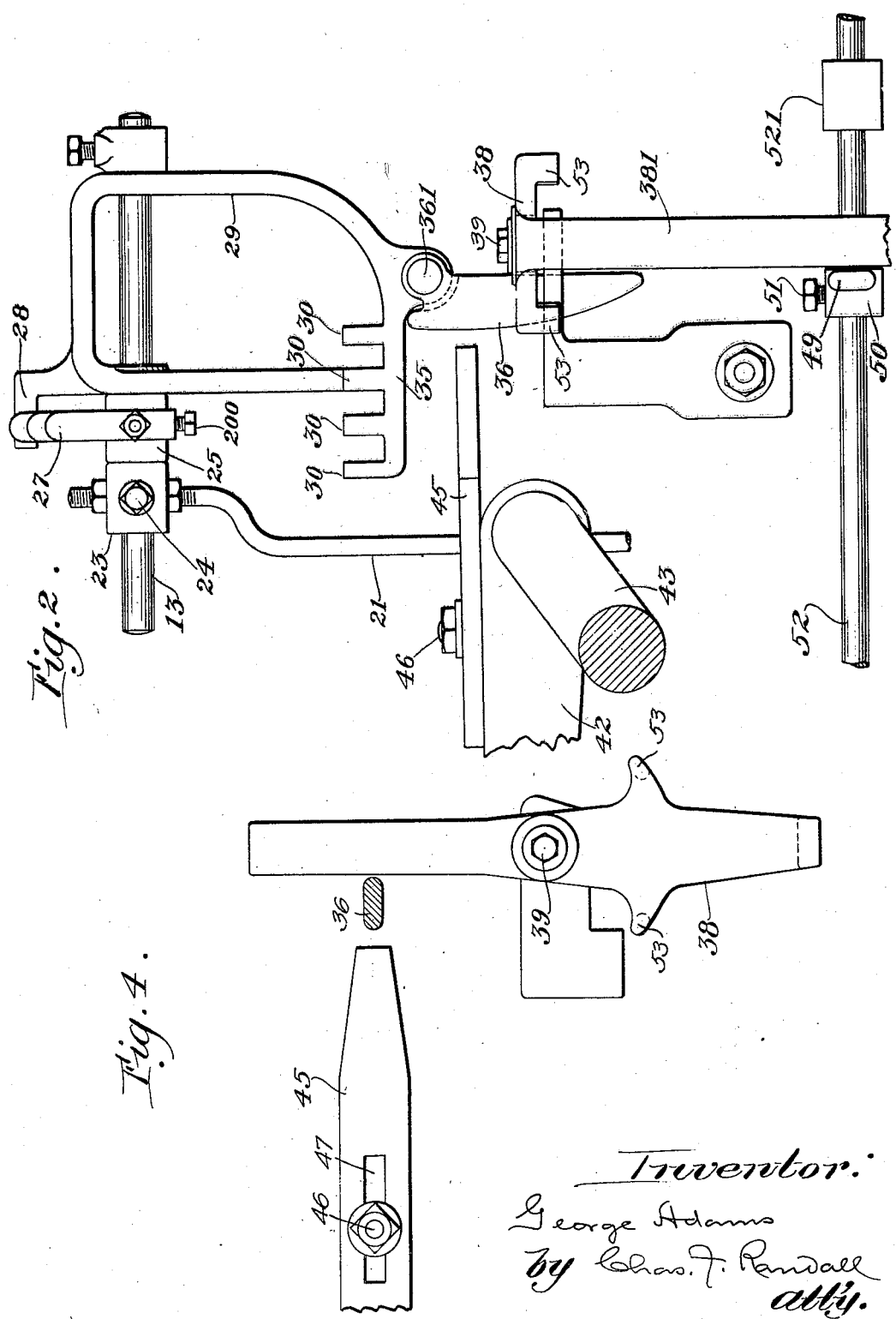
Fig. 2 is a similar view but with certain parts omitted for the sake of greater clearness.

In the case of the illustrated mode of reducing the invention to practice, the more immediate agency for the stopping of the loom is a rod 52 which is located at one side of the loom, and is supported in manner providing for movement thereof longitudinally in a fore-and-aft direction. As one part of the supporting means for such rod the drawings show a guide-bearing 521 that is affixed to side-frame 17. This rod 52 in practice is connected operatively with suitable means (not shown) for controlling the working of the loom, as far example, with knocking-off or power-unshipping devices. For the actuation of rod 52 for knocking-off or unshipping purposes a transmitter-member 38 is provided, therein constituted by a lever, as shown best in Figs. 3 and 4, such lever being related to the rod suitably to provide for giving an endwise movement to the rod, for knocking-off or unshipping purposes, through movement of the said lever around its fulcrum or pivot. In this instance the lever is arranged to swing in a horizontal plane, it being supported by the top of the loom sideframe, with which it is combined pivotally by means of a pivotal bolt 39, and for transmission of movement to rod 52 when the lever is actuated the lever is provided with a downturned extremity 381 adapted to engage a projection 49 extending from a collar 50 fixed in position upon rod 52 by means of a clamping screw 51. The normal position of the parts while power is on and the loom is running is as shown in Figs. 1 and 2, namely with rod 52 shifted toward the right-hand side in such views so that projection 49 is in contact with extremity 381, and with lever 38 held thereby in the relations in which it is represented. It will be perceived that swinging movement of the lever around pivot 39 in a direction carrying extremity 381 toward the left will cause such extremity to shift the rod 52 toward the left, as in Fig. 3, and thereby bring about the knocking-off or power-unshipping and the stopping of the machine.

In this embodiment of the invention a dog 36 is combined with the yieldingly-actuated vibrator through being hung thereto by means of a pivot 361, the pivotal connection being arranged to provide for swinging movement of the dog relative to the vibrator in a direction at right angles with the direction of the movement of the vibrator. The dog is moved back and forth transversely through the vibrating movements of the vibrator, alongside the inwardly extending arm of the transmitter lever, and close to the edge of such arm. The moving striker provided for coaction with the said dog is constituted in this instance by a plate or strip 45 that is attached by means of a bolt 46 to the lay-pitman 42 extending to the lay (not shown) from one of the crank-arms 43 of crankshaft 44. The dog and striker are arranged with reference to each other in such relations that the back and forth transverse movements of the dog in unison with the reciprocating movements of the vibrator extend across the path in which the striker moves. In this instance such path is circular or approximately so.

In principle, the dog is coupled with the reciprocating notched or toothed feeler-bars by means of the yieldingly-actuated vibrator, so that the dog is caused to play back and forth transversely in unison with the reciprocations of the notched or toothed feeler-bars, with proper timing to escape the striker until arrest of the endwise reciprocating movement of the bar or bars by a drop-wire detains the dog in the path of the moving striker. When such arrest takes place, the dog is struck by the striker and thereby the dog is driven in a direction at right angles with the direction of the said reciprocations, thereby causing the dog to actuate the transmitter-lever by turning it around its pivotal center at 39, and thus bringing about the knocking-off or power-unshipping.

To provide for varying, when desired, the extent to which the striker projects from lay-pitman 42, the striker is formed with a slot 47, Fig. 4, extending longitudinally thereof, that is occupied by the stem of the bolt 46 by means of which the striker is fixed upon the lay-pitman.

The outwardly-extending arm of transmitter-lever 38 is shown formed with stop-lugs 53, 53, which are designed to limit the extent of the swinging movements of such lever in either direction, through making contact with adjacent fixed points.

I may employ in some cases a striker mounted and actuated otherwise than through being attached to a lay-pitman. So, also, in some cases the striker, dog, and transmitter-member, may be associated with other forms and arrangements of feelers.

What is claimed as the invention is:—

1. In a loom warp-stop-motion of the endwise-reciprocating toothed feeler-bar type, the combination with a yieldingly actuated vibrator through which the endwise-reciprocating movement is imparted to the toothed feeler-bar or bars, the loom crankshaft, a lay-pitman, a striker upon said lay-pitman, and a lever to transmit motion to effect unshipping of the loom driving power, of a lever-actuating dog, combined with said vibrator, and swinging therewith across the path of the said striker and escaping the striker until the movement of the vibrator and dog is arrested by a drop-wire.

2. A warp-stop-motion having in combination a crankshaft, a striker-member moving therewith in a circular closed path, a vibrating part adapted to be arrested by a drop-wire when a warp-yarn breaks, a lever to transmit motion to unship the loom driving power, and a dog operated through said vibrating part, arranged for actuation by said striker to actuate said lever, and diverted from being engaged by said striker-member by uninterrupted movement of said vibrating part.

3. A warp-stop-motion having in combination a crankshaft, a striker-member moving with said crankshaft in a circular closed path adjacent the crankshaft, a vibrating part adapted to be arrested through a drop-wire when a warp-yarn breaks, a lever to transmit motion to unship the driving power, and a dog operated through said vibrator and positioned by the arrest thereof through a drop-wire to receive motion from the said striker-member and transmit it to the said lever to stop the loom.

4. In a loom warp-stop-motion, the combination with a feeler, a yieldingly-actuated vibrator through which feeling movement is imparted to the feeler, a transmitter-lever, and a rod through which the transmitter-lever operates to transmit motion to effect unshipping of the loom driving power, and a striker, of a dog operated through the vibrator and having in unison with the movements of the latter a swinging movement across the path of the striker, such swinging movement carrying the dog clear of such path until the movement of the feeler, vibrator, and dog is arrested by a drop-wire, said striker acting then through the dog to actuate the said transmitter-lever and rod during the rearward movement of the lay.

5. In a warp-stop-motion of the endwise-reciprocating toothed feeler-bar type, the combination with a striker, a yieldingly-actuated vibrator through which endwise-reciprocating movement is communicated to the toothed feeler-bar or bars, a dog pivotally hung to the said vibrator to swing relative thereto on an axis at right angles with that on which the vibrator swings, and caused by the swinging movements of the vibrator to cross the path of the striker until arrested in the said path by arrest of the endwise-reciprocating toothed feeler-bar or bars through a drop-wire, and a transmitter moved for unshipping purposes through actuation of the dog by the striker.

6. In a warp-stop-motion of the endwise-reciprocating toothed feeler-bar type, the combination with a striker, a yieldingly-actuated vibrator through which endwise-reciprocating movement is communicated to the toothed feeler-bar or bars, a dog pivotally hung to the said vibrator to swing relative thereto on an axis at right angles with that on which the vibrator swings, and caused by the swinging movements of the vibrator to cross the path of the striker until arrested in the said path by arrest of the endwise-reciprocating toothed feeler-bar or bars through a drop-wire, and a transmitter-lever moved for unshipping purposes through actuation of the dog by the striker.

7. In a loom warp-stop-motion of the endwise-reciprocating toothed feeler-bar type, the combination with a yieldingly-actuated vibrator through which the endwise-reciprocating movement is imparted to the toothed feeler-bar or bars, the loom crankshaft, a lay-pitman, a striker connected with the said pitman, and a lever to transmit motion to effect unshipping of the loom driving power, of a dog mounted movably upon the said vibrator, swinging therewith alongside said lever crosswise of the path of the striker, escaping the striker until arrest of the movement of the vibrator and dog in unison by a drop-wire, and when engaged by the striker operated thereby to actuate the said lever.

8. In a warp-stop-motion, the combination with a crankshaft, a striker revolving therewith in a vertical plane, and a yieldingly-actuated feeler, of a dog coupled with the said feeler so that the dog is caused to play back and forth transversely across the path in which the striker revolves, in unison with the to-and-fro movements of the feeler, with proper timing to escape the striker until arrest of the feeler by a drop-wire detains the dog in the path of the moving striker, and a transmitter-member, in operative connection with power knocking-off or unshipping means, which by the striker-produced movement of the dog is actuated to actuate the said power knocking-off or unshipping means to stop the machine.

9. In a warp-stop-motion, the combination with a crankshaft, a lay-pitman, a striker carried by the said lay-pitman, and a yielding-actuated feeler, of a dog coupled with the said feeler so that the dog is caused to play back and forth transversely across the path in which the striker revolves, in unison with the to-and-fro movements of the feeler, with proper timing to escape the striker until arrest of the feeler by a drop-wire detains the dog in the path of the moving striker, and a transmitter-member, in operative connection with power knocking-off or unshipping means, which by the striker-produced movement of the dog is actuated to actuate the said power knocking-off or unshipping means to stop the machine.

GEORGE ADAMS.